United States Patent
Yasuda

(10) Patent No.: US 11,366,751 B2
(45) Date of Patent: *Jun. 21, 2022

(54) STORAGE DEVICE AND STORAGE CONTROL METHOD

(71) Applicant: KIOXIA CORPORATION, Tokyo (JP)

(72) Inventor: Tetsuya Yasuda, Kamakura Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/935,001

(22) Filed: Jul. 21, 2020

(65) Prior Publication Data

US 2020/0349070 A1 Nov. 5, 2020

Related U.S. Application Data

(63) Continuation of application No. 16/284,253, filed on Feb. 25, 2019, now Pat. No. 10,754,771.

(30) Foreign Application Priority Data

Jul. 26, 2018 (JP) .............................. JP2018-140503

(51) Int. Cl.
*G06F 12/02* (2006.01)
*G06F 12/10* (2016.01)

(52) U.S. Cl.
CPC .......... *G06F 12/0253* (2013.01); *G06F 12/10* (2013.01); *G06F 2212/1044* (2013.01); *G06F 2212/657* (2013.01)

(58) Field of Classification Search
CPC ................. G06F 12/0253; G06F 12/10; G06F 2212/1044; G06F 2212/657
See application file for complete search history.

(56) References Cited

U.S. PATENT DOCUMENTS 8,478,796 B2 * 7/2013 Post ..................... G06F 12/0246
707/813
8,661,193 B1 * 2/2014 Cobos ................ G11B 20/1889
711/112

(Continued)

FOREIGN PATENT DOCUMENTS

| JP | 2013174975 A | 9/2013 |
| JP | 2013200722 A | 10/2013 |
| JP | 6313242 B2 | 4/2018 |

*Primary Examiner* — Prasith Thammavong
(74) *Attorney, Agent, or Firm* — Kim & Stewart LLP

(57) ABSTRACT

A storage device includes a nonvolatile memory with physical blocks each including a plurality of clusters, and a controller that maintains a first table storing a relationship between a logical address and a physical address of the cluster, and a second table storing a relationship between a logical block and physical blocks allocated thereto. The controller performs garbage collection processing which includes copying data read from valid clusters of the first logical block to a destination logical block, creating a new logical block when the data read contains an uncorrectable error, allocating the physical blocks of the first logical block to the new logical block, and updating the second table so that the physical blocks of the first logical block are associated with the new logical block and no physical blocks are associated with the first logical block.

14 Claims, 13 Drawing Sheets

(56) References Cited

U.S. PATENT DOCUMENTS

| | | | |
|---|---|---|---|
| 8,825,946 B2 | 9/2014 | Kato et al. | |
| 8,924,832 B1* | 12/2014 | Lam | G06F 11/1016 |
| | | | 714/799 |
| 9,389,973 B2* | 7/2016 | Jones | G06F 11/2094 |
| 2011/0238629 A1* | 9/2011 | Post | G06F 12/0246 |
| | | | 707/674 |
| 2011/0302477 A1* | 12/2011 | Goss | G11C 16/0483 |
| | | | 714/773 |
| 2014/0258804 A1* | 9/2014 | Pangal | H03M 13/27 |
| | | | 714/752 |
| 2015/0046772 A1* | 2/2015 | Bennett | G06F 11/0787 |
| | | | 714/768 |
| 2015/0067244 A1* | 3/2015 | Kruger | G06F 11/1612 |
| | | | 711/103 |
| 2016/0124842 A1 | 5/2016 | Kanno | |
| 2017/0068470 A1* | 3/2017 | Ravimohan | G06F 12/0246 |
| 2018/0121348 A1* | 5/2018 | Sharma | G06F 16/215 |
| 2019/0056994 A1* | 2/2019 | Shulkin | G11C 29/52 |
| 2021/0034516 A1* | 2/2021 | Alkalay | G06F 3/0608 |

* cited by examiner

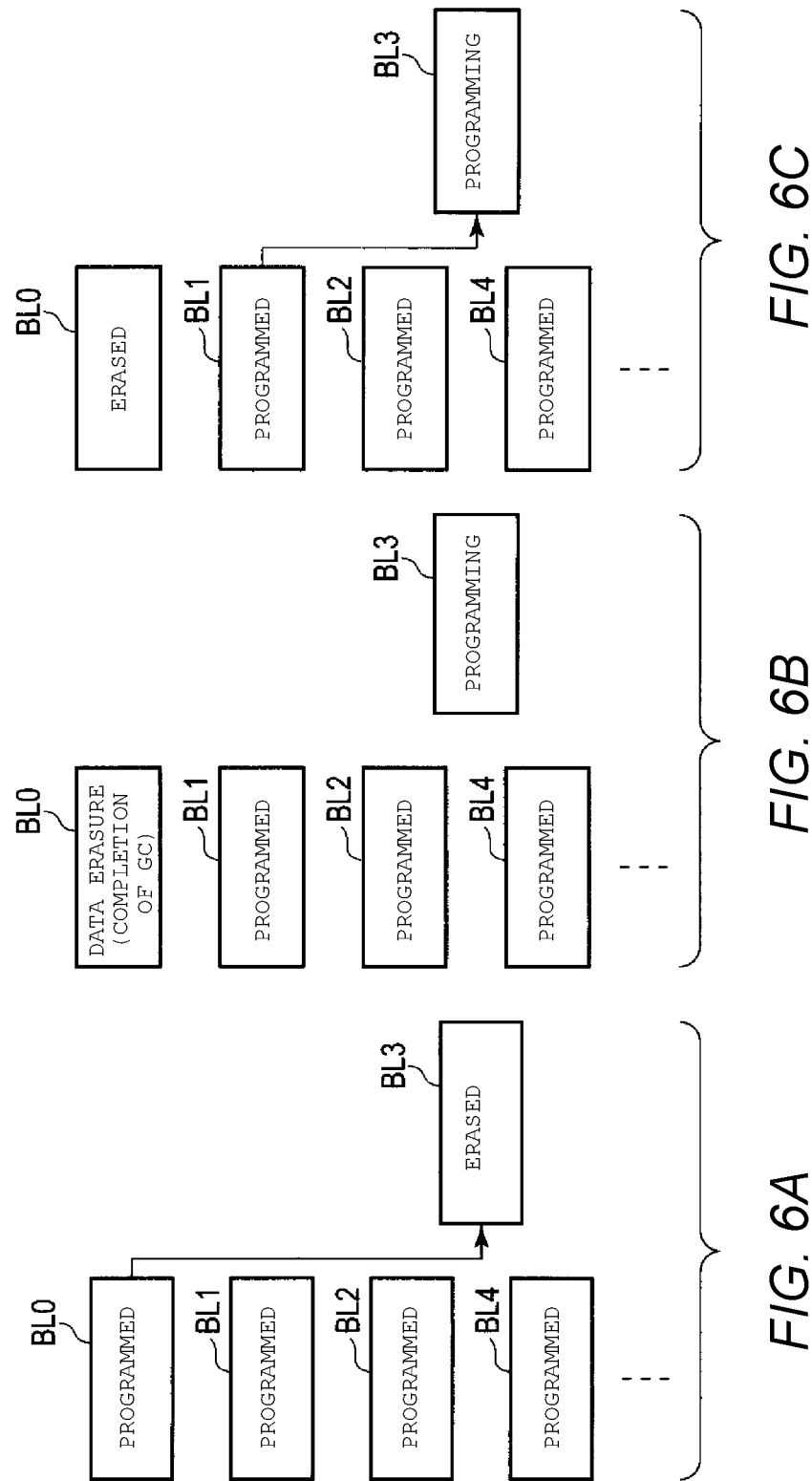

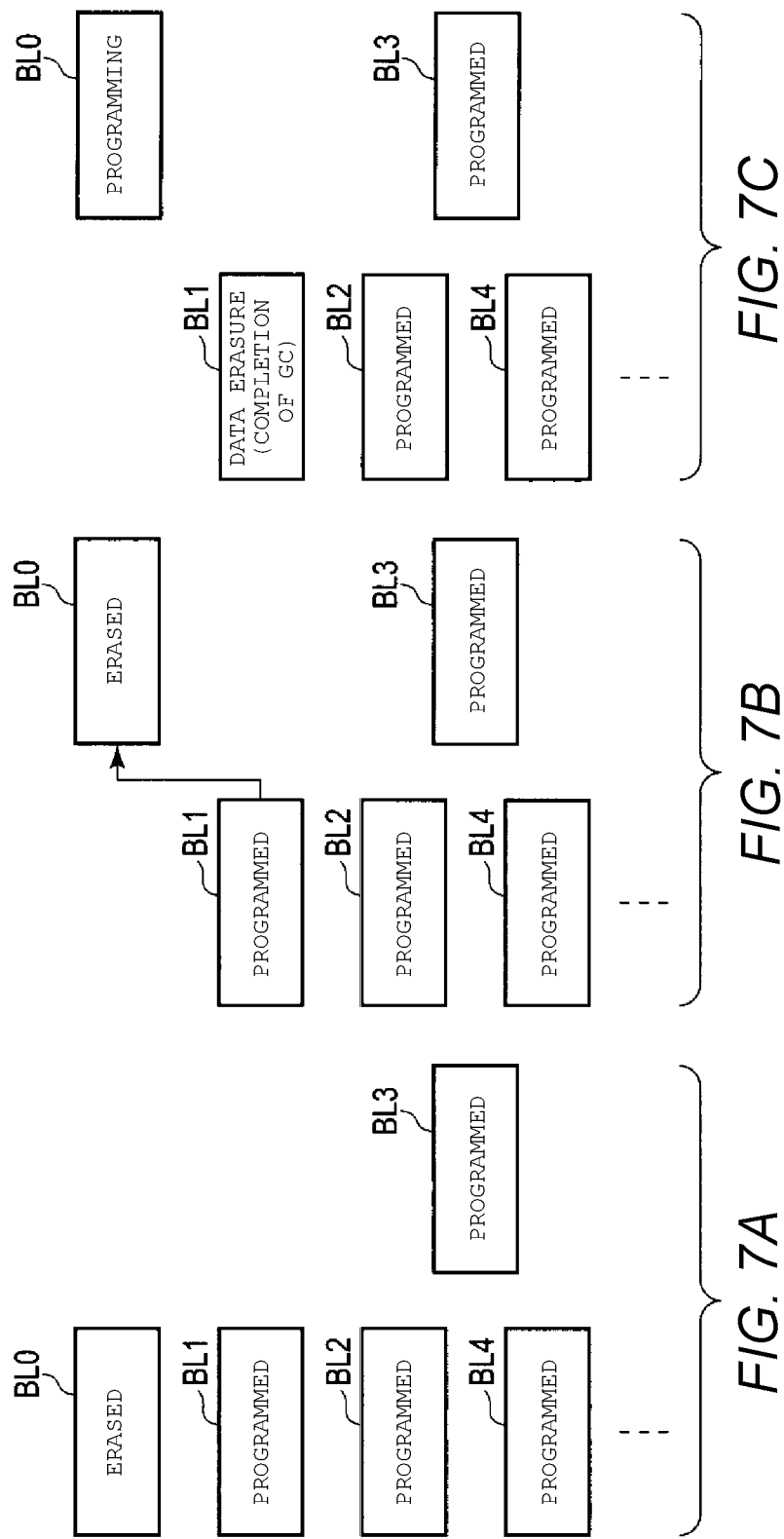

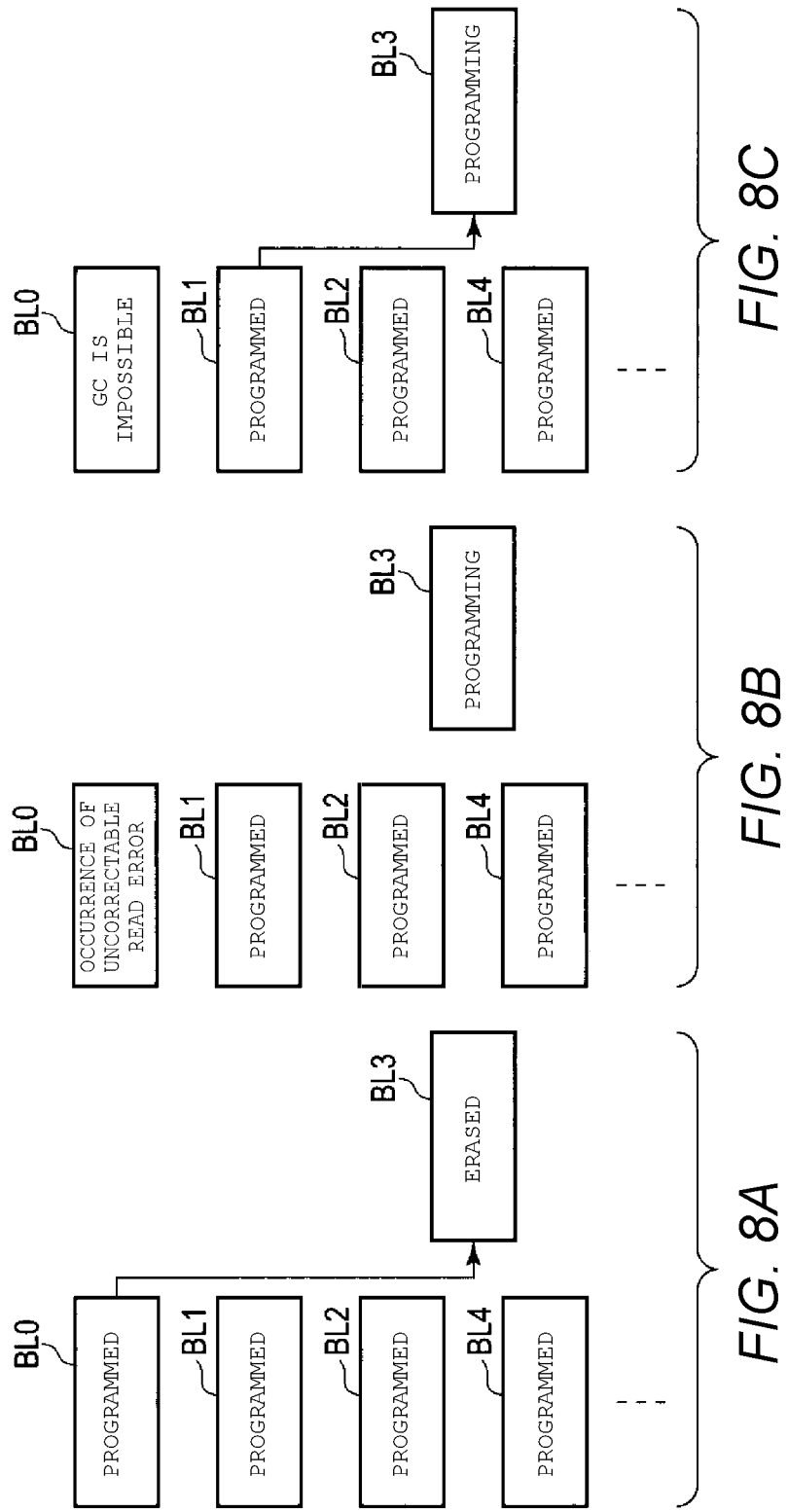

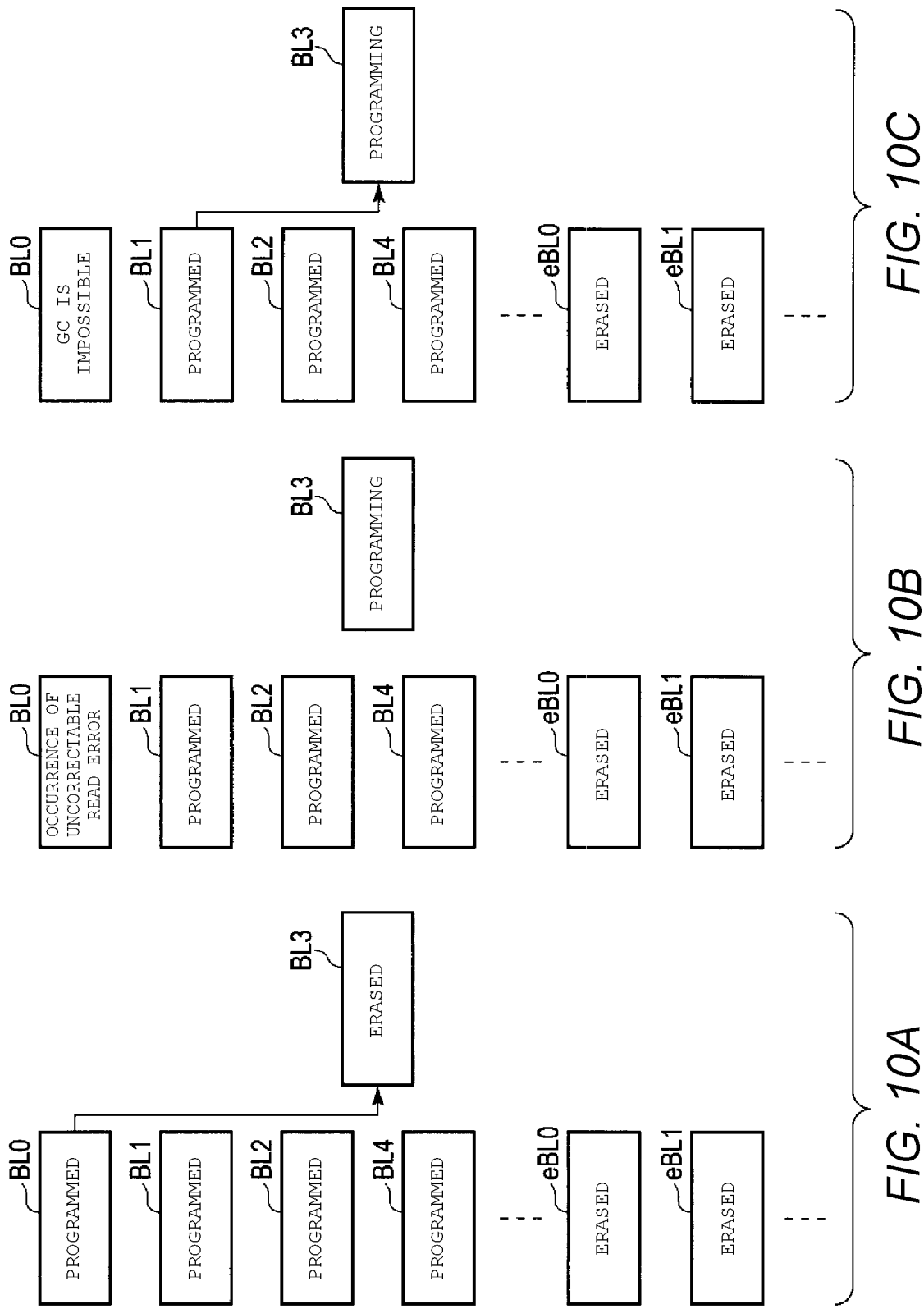

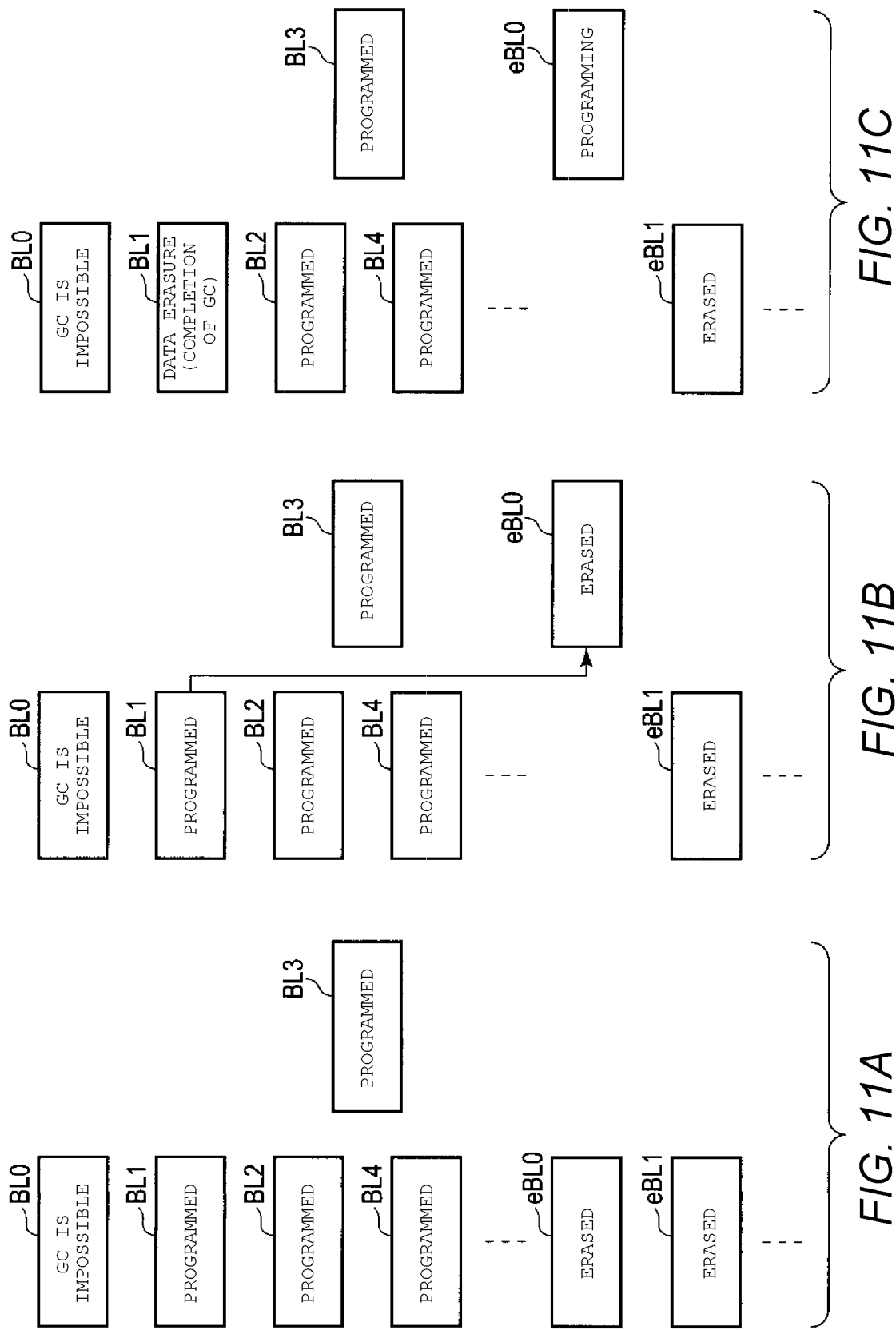

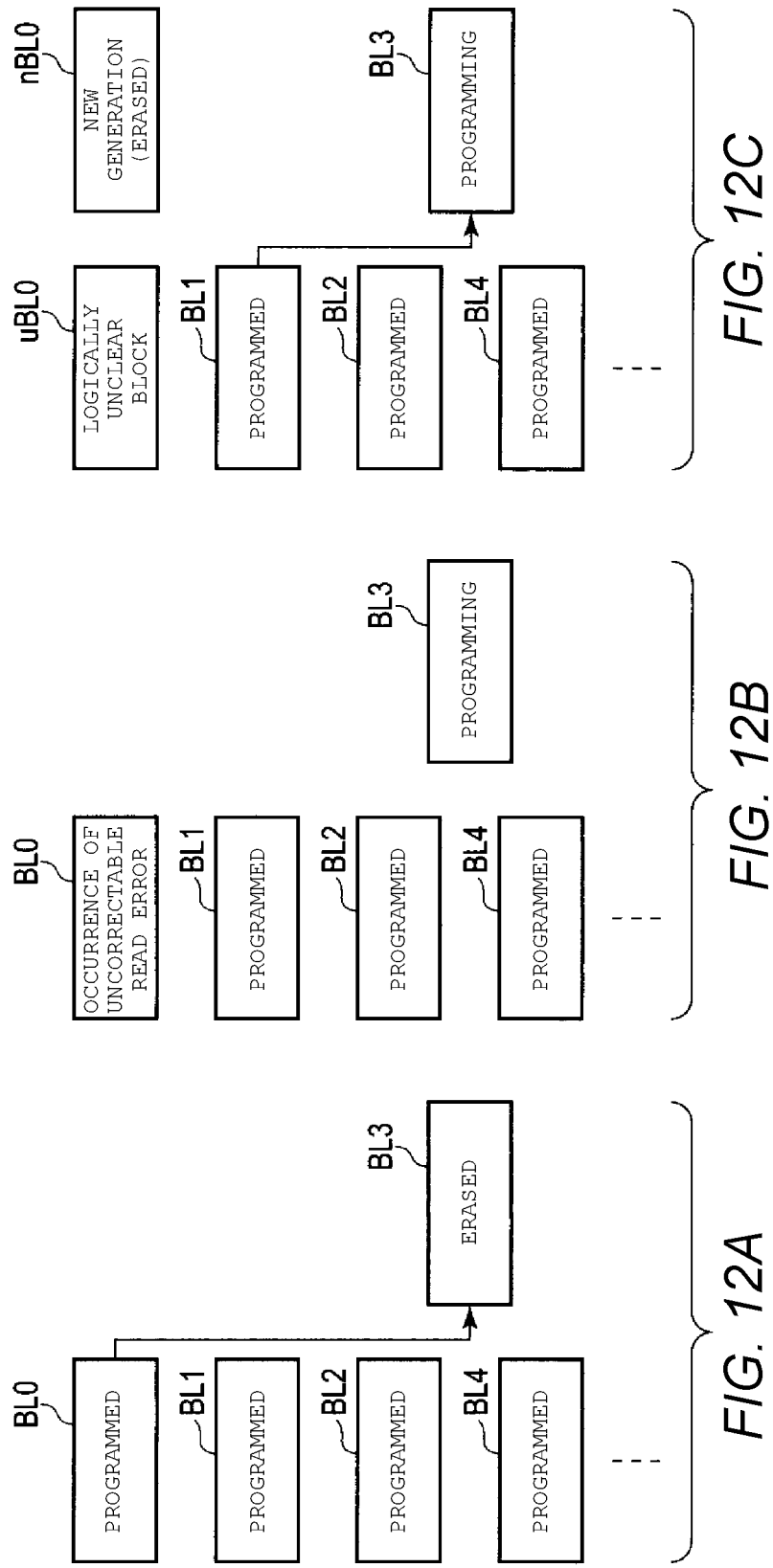

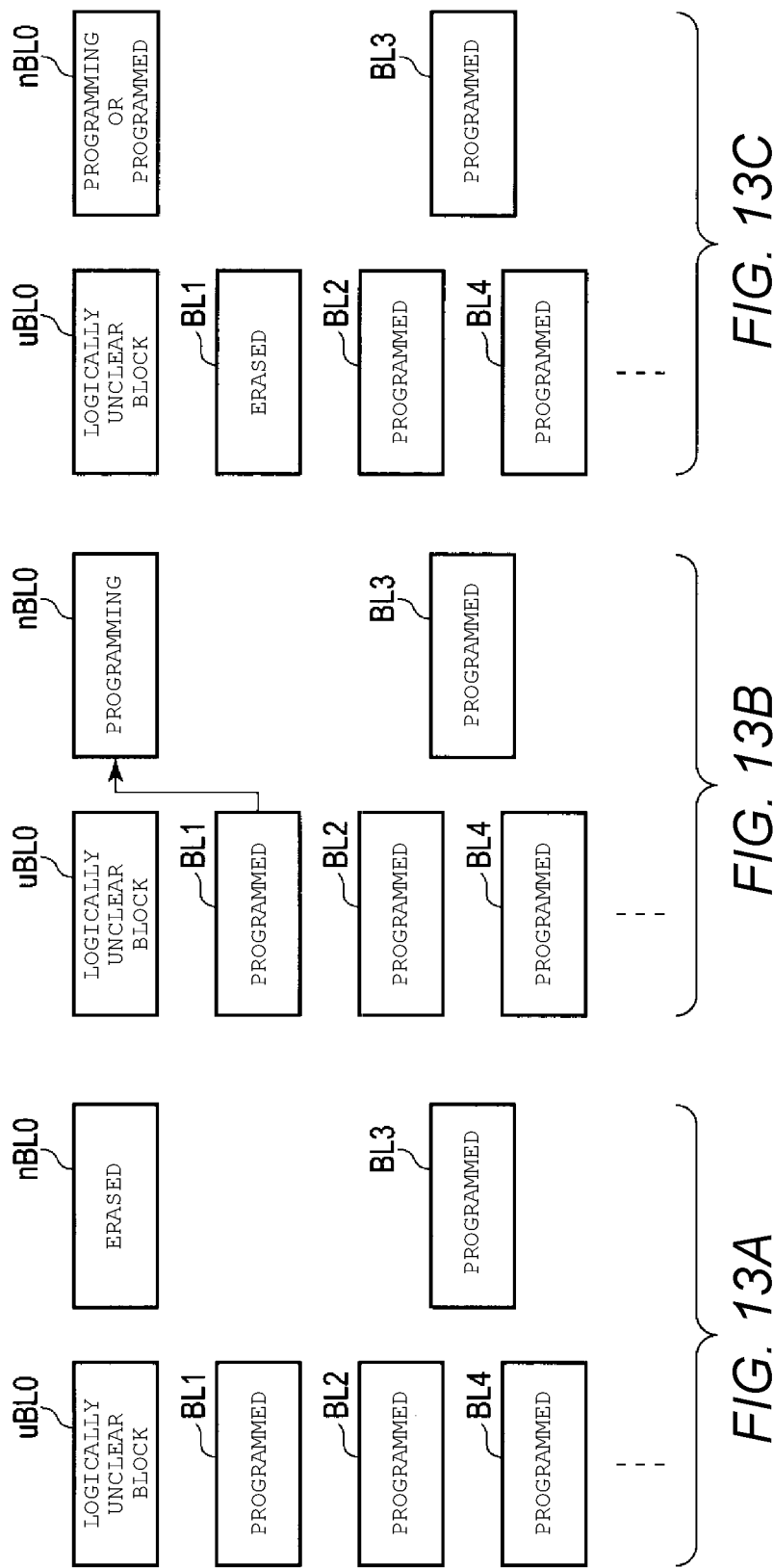

STORAGE DEVICE AND STORAGE CONTROL METHOD

CROSS-REFERENCE TO RELATED APPLICATION

This application is a continuation of U.S. patent application Ser. No. 16/284,253, filed Feb. 25, 2019, which application is based upon and claims the benefit of priority from Japanese Patent Application No. 2018-140503, filed Jul. 26, 2018, the entire contents of which are incorporated herein by reference.

FIELD

Embodiments described herein relate generally to a storage device and a storage control method.

BACKGROUND

In a storage device which includes a nonvolatile semiconductor memory such as a flash memory and is known as a solid state drive (SSD) having the same interface as a hard disk drive (HDD), a unit of data erasure is different from a unit of data read/write. As an example, the unit of data erasure is a physical block and the unit of data read/write is a cluster, which is smaller than the unit of data erasure, because one physical block includes many word lines, one word line many pages, and one page a plurality of clusters.

In the SSD, if data rewriting is performed, there is a high possibility that a valid cluster and an invalid cluster will coexist in the physical block. The valid cluster is a cluster whose physical address is designated by a logical address/physical address conversion table, and the invalid cluster is a cluster whose physical address is not designated by the logical address/physical address conversion table. If the size of the physical block increases, a storage area cannot be utilized effectively.

In order to effectively utilize the storage area, processing called compaction or garbage collection (hereinafter, referred to as garbage collection or GC) is performed. In the garbage collection, in order to increase the number of free blocks in which data is erased, data of all valid clusters in a logical block (referred to as a GC original logical block) including a physical block in which valid and invalid clusters coexist is moved to an erased logical block (referred to as a GC destination logical block). All the data of the GC original logical block from which the data of all the valid clusters is moved to the GC destination logical block are erased. The erased GC original logical block is released as a free block and can be reused as the GC destination logical block.

When reading the data of the cluster in the GC original logical block, an error may occur in the read data, and the error may be uncorrectable in some cases. In this case, whether the cluster from which the data is read is a valid cluster or an invalid cluster cannot be determined. Accordingly, if a read error occurs in data of a certain cluster and the error cannot be corrected, the garbage collection cannot be performed, the data of the GC original logical block cannot be erased, and the GC original logical block cannot be reused as the GC destination logical block.

In such a storage device, when reading data of a cluster of a GC original logical block, if a read error occurs and the error cannot be corrected, there is a concern that a GC destination logical block is exhausted and the garbage collection cannot be performed.

DESCRIPTION OF THE DRAWINGS

FIGS. 6A to 6C are diagrams illustrating examples of a garbage collection.

FIGS. 7A to 7C are diagrams illustrating examples of the garbage collection.

FIGS. 8A to 8C are diagrams illustrating examples of the garbage collection when a GC destination logical block is exhausted.

FIGS. 10A to 10C are diagrams illustrating examples of the garbage collection for avoiding exhaustion of the GC destination logical block.

FIGS. 11A to 11C are diagrams illustrating examples of the garbage collection for avoiding exhaustion of the GC destination logical block.

FIGS. 12A to 12C are diagrams illustrating other examples of the garbage collection for avoiding exhaustion of the GC destination logical block.

FIGS. 13A to 13C are diagrams illustrating more examples of the garbage collection for avoiding exhaustion of the GC destination logical block.

DETAILED DESCRIPTION

Figure 1:
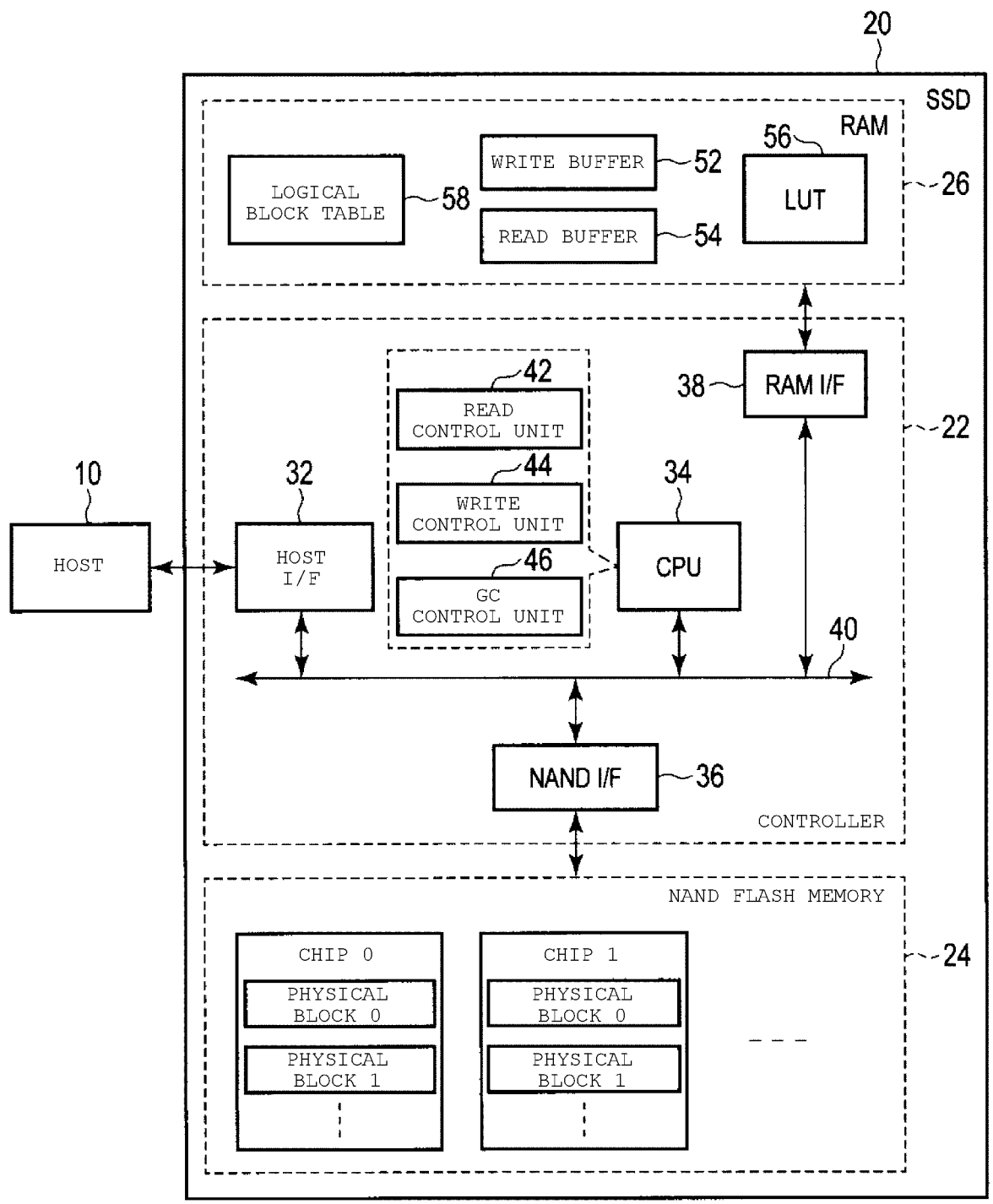
FIG. 1 is a block diagram illustrating a configuration of an example of a storage device according to an embodiment.

Embodiments provide a storage device and a storage control method which designates a GC original logical block even if an uncorrectable read error occurs and performs a garbage collection.

In general, according to one embodiment, a storage device includes a nonvolatile memory that includes a plurality of physical blocks each including a plurality of clusters, and a controller configured to maintain a first table that stores a relationship between a logical address designated by an external device and a physical address of the cluster corresponding to the logical address, and second table that stores a relationship between a logical block corresponding to the logical address and one or more of the plurality of physical blocks that are allocated to the logical block. The controller is configured to perform garbage collection processing which includes reading all data from physical blocks of a first logical block and copying the data read from valid clusters of the first logical block to physical blocks of a garbage collection destination logical block, creating a new logical block when any of the data read from the physical blocks of the first logical block contains an uncorrectable error, allocating the physical blocks corresponding to the first logical block to the new logical block, updating the second table so that the physical blocks of the first logical block are associated with the new logical block and no physical blocks are associated with the first logical block.

Hereinafter, embodiments will be described with reference to the drawings. The disclosure merely provides examples and is not limited by the content described in the following embodiments. Naturally, modifications which can be easily made by those skilled in the art are included in the scope of the disclosure. In order to make the description clearer, in some cases, a size, a shape, and the like of each part may be schematically illustrated instead of illustrating their actual size, shape, and the like of each part. In a plurality of drawings, corresponding elements are denoted by the same reference numerals or symbols, and a detailed description thereof may be omitted in some cases.

FIG. 1 is a block diagram illustrating a configuration of an example of an SSD 20 according to an embodiment. The SSD 20 is a semiconductor storage device configured to write data in a nonvolatile semiconductor memory and to read data from the nonvolatile semiconductor memory. The SSD 20 is connected to a host 10. The host 10 accesses the SSD 20, writes data to the SSD 20, and reads the data from the SSD 20. The host 10 may be a server that stores a large amount of data and various types of data in the SSD 20 (e.g., a storage server) or may be a personal computer. The SSD 20 can be used as a main storage of the host 10. The SSD 20 may be embedded in the host 10 or may be connected to the host 10 via a cable or a network.

The SSD 20 includes a controller 22, a NAND flash memory (hereinafter, referred to as flash memory) 24, and a RAM 26. The controller 22 includes a host interface (I/F) 32, a CPU 34, a NAND interface (I/F) 36, and a RAM interface (I/F) 38. The CPU 34, the host I/F 32, the NAND I/F 36, and the RAM I/F 38 are connected to a bus line 40. The controller 22 may be implemented by a CPU operating according to software or may be implemented by a circuit such as a system-on-chip (SoC), an ASIC, an FPGA, or the like.

The host I/F 32 for electrically interconnecting the host 10 with the SSD 20 may use standards, such as Small Computer System Interface® (SCSI), PCI Express® (also referred to as PCIe®), Serial Attached SCSI® (SAS), Serial Advanced Technology Attachment® (SATA), Non Volatile Memory Express (NVMe®), or Universal Serial Bus® (USB), and is not limited to these. The host I/F 32 functions as a circuit that receives various commands, such as I/O commands and various control commands from the host 10. The I/O command may include a write command, a read command, and the like.

The flash memory 24 as a nonvolatile semiconductor memory is configured with, for example, a NAND type flash memory, is not limited to the NAND type flash memory, and may be configured with other nonvolatile semiconductor memory, such as a NOR type flash memory, a magnetoresistive random access memory (MRAM), a phase change random access memory (PRAM), a resistive random access memory (ReRAM), or a ferroelectric random access memory (FeRAM). The flash memory 24 may include a plurality of flash memory chips (also referred to as flash memory dies). Each flash memory chip includes a memory cell array including a plurality of memory cells arranged in a matrix. The flash memory 24 may be a NAND type flash memory of a two-dimensional structure or a NAND type flash memory of a three-dimensional structure.

Each flash memory chip includes a plurality of physical blocks including a plurality of nonvolatile memory cells. In the flash memory 24, data is erased collectively on a physical block basis. That is, the physical block is an area of a data erase unit. Data read and data write are performed on a cluster basis. One cluster includes data associated with one logical address range, or data associated with apart of the one logical address range. Read and write of the flash memory 24 are controlled by the controller 22. The flash memory 24 is connected to the NAND I/F 36.

One bit or a plurality of bits of data may be stored in a memory cell. An example of a flash memory configured to be capable of storing a plurality of bits per memory cell includes a multi-level cell (MLC) flash memory or a four-level cell (4LC) flash memory, which is capable of storing 2-bit data per memory cell, a triple-level cell (TLC) flash memory or an eight-level cell (8LC)) flash memory, which is capable of storing 3-bit data per memory cell, a quad-level cell (QLC) flash memory or a sixteen-level cell (16LC) flash memory, which is capable of storing 4-bit data per memory cell, and the like. The flash memory configured to store one bit per memory cell is referred to as a single-level cell (referred to as SLC or 2LC)) flash memory.

The RAM 26 is implemented by a DRAM, an SRAM, or the like which is a volatile memory, and may be embedded in the controller 22 without any part being provided outside the controller 22. The RAM 26 includes a write buffer 52 which is a buffer area for temporarily storing data to be written to the flash memory 24, a read buffer 54 which is a buffer area for temporarily storing data read from the flash memory 24, a lookup table (referred to as an LUT 56 functioning as an address translation table (also referred to as a logical address/physical address translation table), and a logical block/physical block translation table 58 illustrating an assignment relation between the logical block and the physical block. In the embodiments described herein, the LUT 56 manages mapping between a logical cluster address and a pseudo physical cluster address. The RAM 26 is connected to the RAM I/F 38.

The controller 22 may function as a flash translation layer (FTL) configured to perform data management and block management of the flash memory 24. The data management performed by the FTL in the embodiments includes (1) management of mapping information illustrating a correspondence relationship between the logical address (in particular, logical cluster address) of the SSD 20 and the physical address (in particular, pseudo physical cluster address) of the flash memory 24, (2) a process for hiding read/write of the cluster and a block erase operation, and the like. The logical address is designated by the host 10 so as to designate an address of the SSD 20.

Management of the mapping between the logical address and the physical address is performed by using the LUT 56. The controller 22 uses the LUT 56 to manage the mapping between the logical address and the physical address on a cluster size basis. A physical address corresponding to a certain logical address indicates a physical storage location in the flash memory 24 to which data designated by this logical address is written. The LUT 56 may be loaded from the flash memory 24 into the RAM 26 when the SSD 20 is power on.

The CPU 34 may function as a read control unit 42, a write control unit 44, a garbage collection (GC) control unit 46, and the like. A part or all of the read control unit 42, the write control unit 44, and the GC control unit 46 may also be implemented by dedicated hardware in the controller 22. The write control unit 44 performs error correction coding of the write data and writes the encoded data into the flash memory 24. The read control unit 42 performs the error correction decoding of the data read from the flash memory 24 and corrects an error in the read data. The error correction coding and the error correction decoding may be performed by dedicated hardware in the controller 22. The GC control unit 46 performs a garbage collection at an appropriate timing.

The write control unit 44 writes the update data corresponding to a certain logical address into another cluster instead of a cluster designated by the physical address corresponding to the logical address. The write control unit 44 then updates the LUT 56 and associates the logical address with the physical address that designates another cluster. Thereby, the previous data is not read, and the cluster storing the previous data is invalidated.

Block management includes defective block management, wear leveling, garbage collection, and the like.

The CPU 34 is a processor configured to control the host I/F 32, the NAND I/F 36, and the RAM I/F 38. The CPU 34 performs various processes by executing a control program (e.g., firmware) stored in a ROM (not illustrated) or the like. In addition to the above-described FTL process, the CPU 34 may perform a command process and the like for processing various commands from the host 10. An operation of the CPU 34 is controlled by the above-mentioned firmware executed by the CPU 34. A part or all of the FTL process and the command process may be performed by dedicated hardware in the controller 22.

Figure 2:
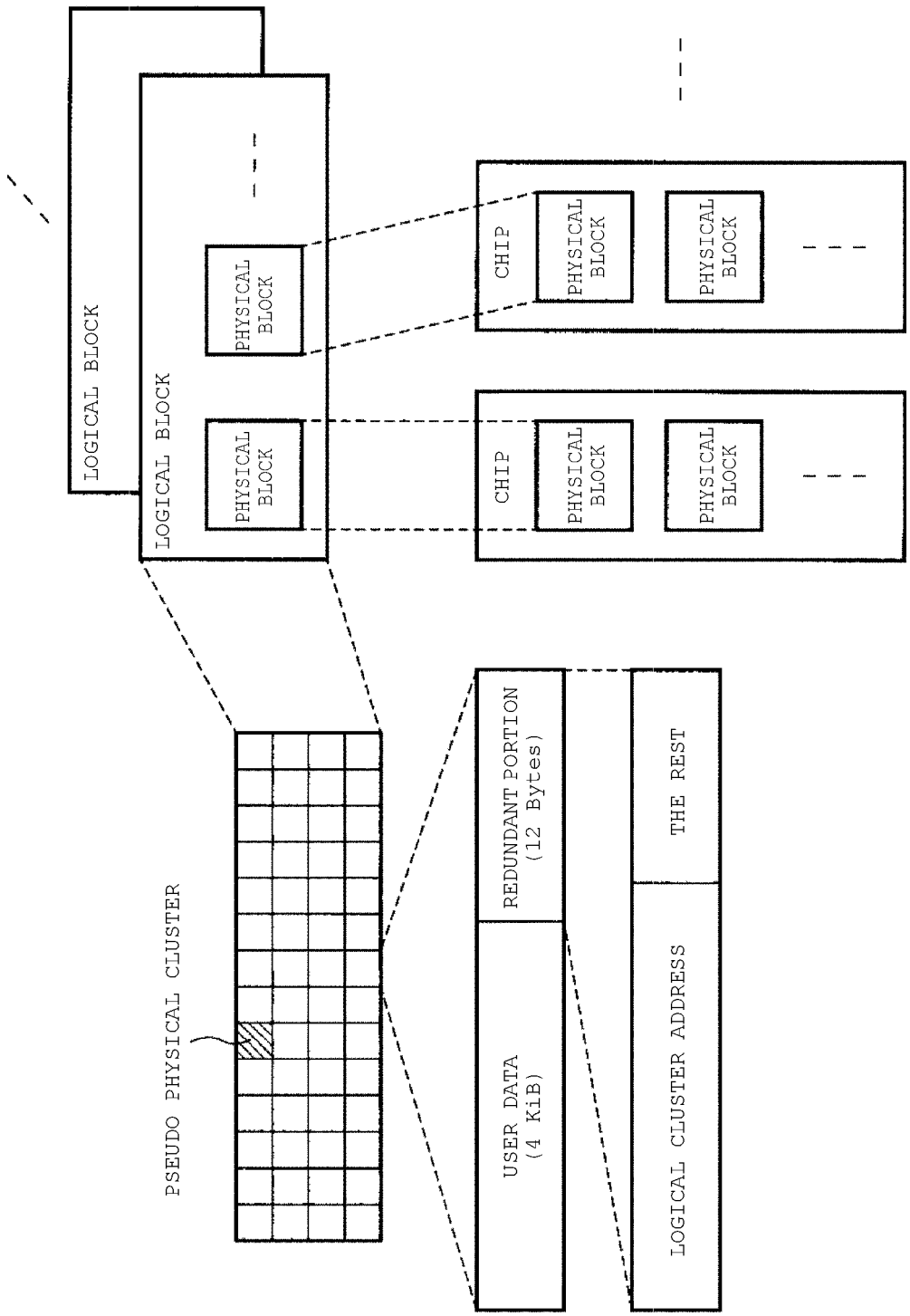
FIG. 2 is a diagram illustrating a relationship between a physical block, a logical block, and a pseudo physical cluster.

FIG. 2 is a diagram illustrating a relationship between a physical block, a logical block, and a pseudo physical cluster. As described above, the NAND chip includes a plurality of physical blocks, and the plurality of physical blocks are assigned to one logical block. The plurality of physical blocks assigned to one logical block may be a plurality of physical blocks in a single chip or may be a plurality of physical blocks across several chips. The number of physical blocks assigned to one logical block may be constant irrespective of the logical block or may be changed by the logical block. A plurality of pseudo physical clusters are assigned to one logical block. Information stored in one pseudo physical cluster includes user data (for example, 4 KB) and a redundant portion (for example, 12 bytes). The redundant portion includes a logical cluster address and other information.

The pseudo physical cluster address includes information indicating which logical block includes the pseudo physical cluster, and information indicating what number the pseudo physical cluster is from a first pseudo physical cluster in the logical block, that is, information indicating a relative location of the pseudo physical cluster in the logical block. When accessing the pseudo physical cluster address, the host designates a logical cluster address. Information indicating mapping between the physical address corresponding to the logical address, that is, the logical cluster address and the pseudo physical cluster address is stored in the LUT 56.

Figure 3:
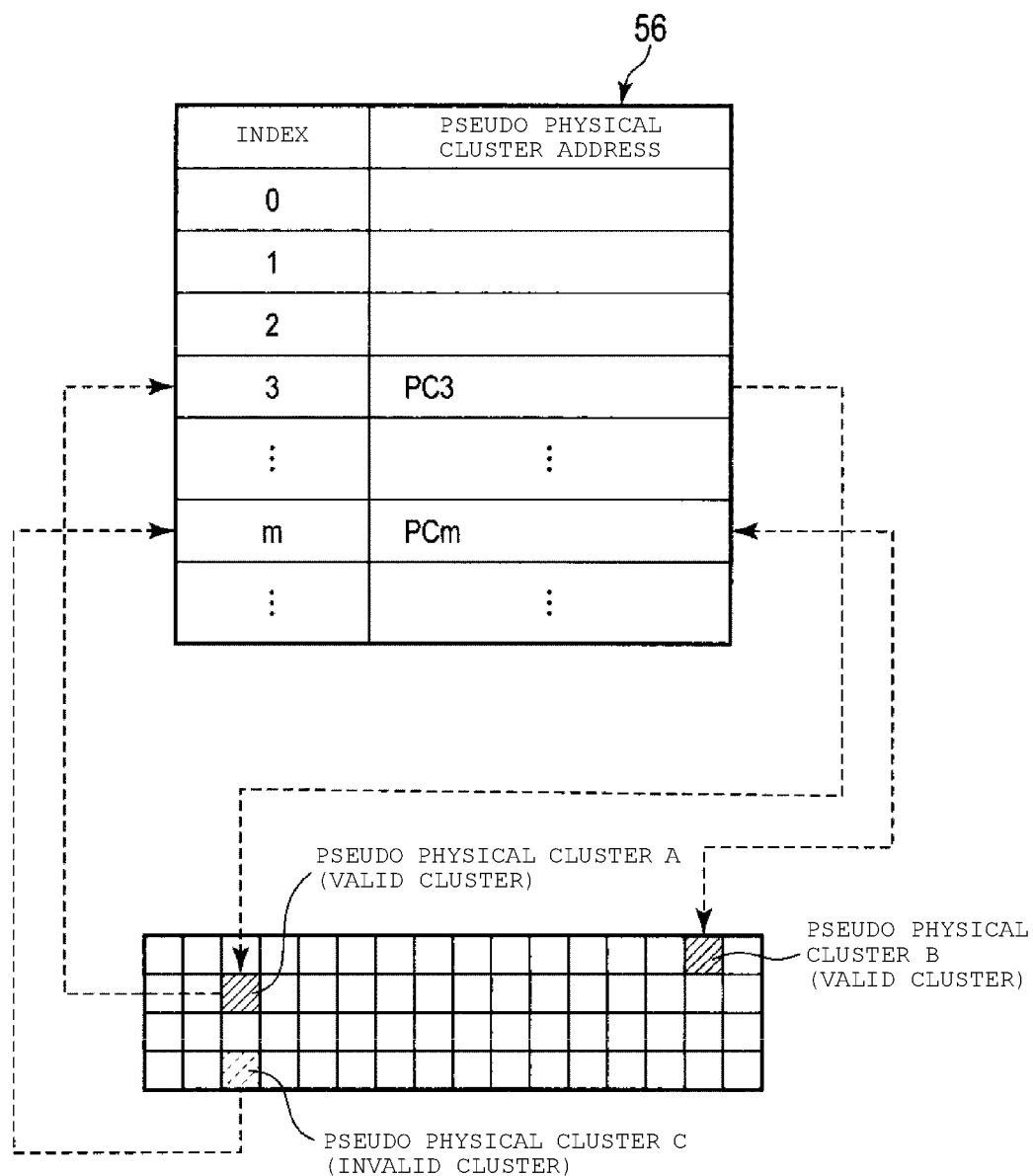
FIG. 3 is a diagram illustrating an example of an LUT.

FIG. 3 illustrates an example of the LUT 56. The LUT 56 stores the pseudo physical cluster address, and an index of the pseudo physical cluster address corresponds to the logical cluster address. The logical address is represented by index×cluster size (4 KB). The 4 KB is the logical cluster size, and the physical cluster size is 4 KB+12 bytes. If the index is obtained by dividing the logical address given from the host 10 by a cluster size, the pseudo physical cluster address corresponding to the logical address is obtained.

For example, as shown in FIG. 3 when a logical cluster address in the redundant portion stored in a pseudo physical cluster A which is designated by a pseudo physical cluster address PC3 corresponds to index 3, the pseudo physical cluster A is a valid cluster. Likewise, when a logical cluster address in the redundant portion stored in the pseudo physical cluster B which is designated by a pseudo physical cluster address PCm corresponds to index m, a pseudo physical cluster B is a valid cluster. Meanwhile, a pseudo physical cluster not designated by the LUT 56 is an invalid cluster. For example, as shown in FIG. 3 a pseudo physical cluster C which has not been designated by a pseudo physical cluster address in the LUT 56 is an invalid cluster regardless of existence of a logical cluster address in the redundant portion stored in its pseudo physical cluster C.

In this way, if all the pseudo physical cluster addresses of the LUT 56 are examined, it is possible to determine whether the pseudo physical cluster is a valid cluster or an invalid cluster. Further, it is possible to determine whether the pseudo physical cluster is a valid cluster or an invalid cluster using the following technique. For example, it is assumed that when a pseudo physical cluster address of a pseudo physical cluster D is PCd, a logical cluster address of a redundant portion of the pseudo physical cluster D is LCd, and a pseudo physical cluster address corresponding to the logical cluster address LCd in the LUT 56 is PCe. When the pseudo physical cluster addresses PCd and PCe are equal to each other, the pseudo physical cluster D is a valid cluster, and when the pseudo physical cluster addresses PCd and PCe are not equal, it is determined that the pseudo physical cluster D is an invalid cluster. That is, when the pseudo physical cluster address corresponding to the logical cluster address of the information stored in the pseudo physical cluster designated by a certain pseudo physical cluster address in the LUT 56 matches the certain pseudo physical cluster, the pseudo physical cluster is a valid cluster, and when the pseudo physical cluster address does not match the certain pseudo physical cluster, the pseudo physical cluster is an invalid cluster.

Thus, for example, if a command for writing data DA1 into a certain logical cluster address LC1 is sent from the host 10, the write control unit 44 writes the data DA1 into a certain pseudo physical cluster (a pseudo physical cluster address of this cluster is referred to as PC1). The write control unit 44 sets mapping between the logical cluster address LC1 and the pseudo physical cluster address PC1 to the LUT 56. Thereafter, if a write command for reprogramming data DA2 to the logical cluster address LC1 is transmitted from the host 10, the write control unit 44 writes the data DA2 into the pseudo physical cluster different from the previous pseudo physical cluster (referred to as a pseudo physical cluster address PC2 of this cluster). The write control unit 44 sets the mapping between the logical cluster address LC1 and the pseudo physical cluster address PC2 to the LUT 56. Thereby, the pseudo physical cluster address PC1 is no longer designated from the LUT 56, and the pseudo physical cluster (pseudo physical cluster address PC1) to which the data DA1 is written becomes an invalid cluster, and the data DA1 becomes invalid data. As such, if rewriting the data causes an invalid cluster to be generated and the number of physical blocks in which the valid cluster and the invalid cluster coexist increases, in order to effectively utilize a storage area, a garbage collection process is performed for the logical block including the physical block.

Figure 4:
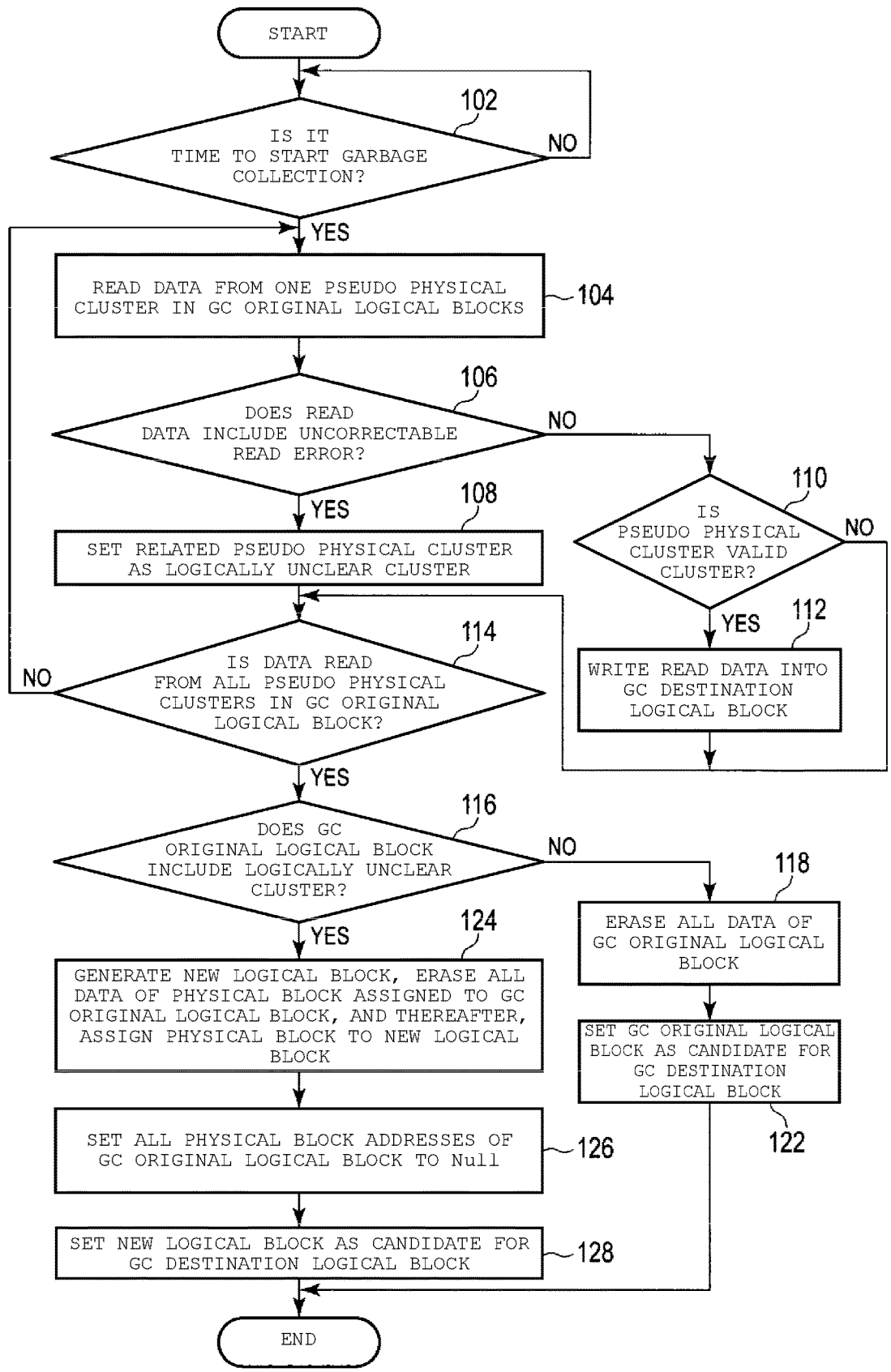
FIG. 4 is a flowchart illustrating an example of a garbage collection process.

FIG. 4 is a flowchart illustrating an example of the garbage collection process.

The controller 22 determines whether or not it is time to start the garbage collection, based on whether or not a garbage collection command is received from the host 10. In addition, since the controller 22 manages a state of the block, the controller 22 also determines whether or not it is time to start the garbage collection by detecting that the number of physical blocks in which the valid cluster and the invalid cluster coexist increases beyond a preset threshold.

If it is determined that it is time to start the garbage collection (step 102, YES), the controller 22 reads data from one pseudo physical cluster in one logical block (referred to as a GC original logical block) among garbage collection target candidate logical blocks including the physical block in which the valid cluster and the invalid cluster coexist (step 104). The read data is stored in the read buffer 54.

The controller 22 determines whether or not the read data includes an uncorrectable read error (step 106). When the read data includes an error, the controller 22 performs a correction of the error. However, there is possibility for an error that the controller 22 cannot correct, depending on a type and degree of the error. In this case, it is impossible to determine whether a cluster that stored data having uncorrectable error is a valid cluster or an invalid cluster according to the techniques described above.

Therefore, when it is determined that the read data includes an uncorrectable error (step 106, YES), the controller 22 determines the pseudo physical cluster as a logically unclear cluster (step 108).

If it is determined that the read data does not include an uncorrectable error (step 106, NO), the controller 22 determines whether or not the pseudo physical cluster is a valid cluster (step 110). As described in FIG. 3, this determination is made with the LUT 56 based on the pseudo physical cluster address corresponding to the logical cluster address in a redundant portion stored in the pseudo physical cluster from which the data was read.

If this pseudo physical cluster address points to the pseudo physical cluster from which data was read, the pseudo physical cluster is a valid cluster. If not, the pseudo physical cluster is an invalid cluster.

If it is determined that the pseudo physical cluster is a valid cluster (step 110, YES), the controller 22 writes the data into one pseudo physical cluster of the GC destination logical block (step 112). The GC destination logical block is selected from among the logical blocks (also, referred to as free blocks) in which all data are erased. If writing into the GC destination logical block is completed, the controller 22 updates the LUT 56 regarding the one pseudo physical cluster of which the data is written.

After performing the process of step 108 or step 112, or if it is determined that the pseudo physical cluster is an invalid cluster (step 110, NO), the controller 22 determines whether or not data is read from all the pseudo physical clusters in the GC original logical block (step 114). If it is determined that data is not read from all the pseudo physical clusters in the GC original logical block (step 114, YES), the controller 22 performs step 104 again. That is, the controller 22 reads data from another pseudo physical cluster in the GC original logical block and repeats the same process.

If it is determined that data is read from all the pseudo physical clusters in the GC original logical block (step 114, YES), the controller 22 determines whether or not the GC original logical block includes the logically unclear cluster. When the GC original logical block does not include the logically unclear cluster, all data of the valid cluster in the GC original logical block has been moved to the GC destination logical block. When the GC original logical block includes the logically unclear cluster, the controller 22 is able to determine that all the data of the valid cluster has been moved to the GC destination logical block is unknown. If it is determined that the GC original logical block does not include the logically unclear cluster (step 116, NO), the controller 22 erases the data of all the physical blocks of the GC original logical block (step 118). The controller 22 sets the GC original logical block whose all data is erased as a candidate for a GC destination logical block (step 122) and ends the process (END).

If it is determined that the GC original logical block includes the logically unclear cluster (step 116, YES), the controller 22 erases the data of all the physical blocks being assigned to the GC original logical block, and assigns the data-erased physical block to a new logical block (step 124).

The controller 22 updates the second table so that the physical block is not allocated to the GC original logical block after performing step 124 (step 126). Thereby, after setting the physical block addresses of the GC original block to null, since there is no pseudo physical cluster address corresponding to the logically unclear cluster address, the data cannot be read and a read error is returned to the host 10.

The controller 22 sets the new logical block as a candidate for the GC destination logical block (step 128) and ends the process (END) after step 126.

FIG. 4 illustrates an example in which the process ends after step 128, and if the determination process of step 102 is periodically performed and it is time to start the garbage collection, the process of FIG. 4 may be is performed as an interrupt.

Figure 5A:
FIGS. 5A to 5C are diagrams illustrating examples of state changes of a logical block/physical block translation table.
Figure 5B:
Figure 5C:

Generating a new logical block will be described with reference to FIGS. 5A to 5C. FIGS. 5A to 5C illustrate examples of state changes of the logical block/physical block table 58 illustrating an assignment relationship between a logical block address and a physical block address. FIG. 5A illustrates the logical block/physical block table 58 before step 124 is performed, for example, while step 116 is performed. FIG. 5B illustrates the logical block/Physical block table 58 when step 124 is completed. FIG. 5C illustrates the logical block table 58 when step 126 is completed. It is assumed that (m+1) logical blocks (logical blocks with logical block addresses LB0 to LBm) are generated. The physical blocks designated by physical block addresses PB0, PB1, . . . and the like are assigned to the logical block indicated by the logical block address LB0, and the physical blocks designated by physical block addresses PBi, PBi+1, . . . and the like are assigned to the logical block indicated by the logical block address LBm. In FIGS. 5A to 5C, the physical blocks of consecutive physical block addresses are assigned to the logical blocks, but this is merely an example, and a physical block of a certain discrete physical block address may be assigned to a logical block. It is assumed that the logical block of the logical block address LBm is a GC original logical block including a logically unclear cluster and thus a logically unclear block. It is assumed that the logical block address of the new logical block generated in step 124 is LBm+1 as illustrated in FIG. 5B.

As illustrated in FIG. 5C, the controller 22 sets the physical block addresses of all the physical blocks corresponding to the GC original logical block designated by the logical block address LBm in the logical block/physical block table 58 as a value Null that does not exist as an address in step 126. Thereby, the GC original logical block is regarded as an unknown physical block. An example of Null is "FF" and the like in a case of a 16-bit address. Thereby, when the host 10 tries to read data in a logically unclear cluster, the data of the pseudo physical cluster corresponding to the logically unclear cluster cannot be read and a read error is returned to the host 10.

Thereby, even if there is a logically unclear cluster, it is possible to allocate the data-erased GC destination logical block which is necessary for a garbage collection process and to avoid a state in which the garbage collection process cannot be performed.

Hereinafter, an example of an operation of the garbage collection for each specific situation will be described.

FIGS. 6A to 7C illustrate examples when the GC destination logical blocks are sequentially generated and the garbage collection is continuously performed. Programming the logical blocks BL0, BL1, BL2, BL4, . . . is completed, and erasing the data in the logical block BL3 is completed. The program completion indicates a state in which data is written to the extent that there is no room to write new data. The data-erased logical block BL3 may be a GC destination logical block.

It is assumed that valid clusters and invalid clusters coexist in the program-completed logical blocks BL0, BL1, BL2, BL 4, . . . , and the logical blocks BL0, BL1, BL2, BL4, . . . are candidates for GC original logical blocks. First, as illustrated in FIG. 6A, one of the GC original logical block candidates, for example, the logical block BL0 is set as the GC original logical block, data is read from the GC original logical block BL0 on a pseudo physical cluster basis, and when the pseudo physical cluster is a valid cluster, the read data is moved to the GC destination logical block BL3. The GC destination logical block BL3 changes from a data-erased state to a programming state.

If data read from all valid clusters of the GC original logical block BL0 is moved to the GC destination logical block BL3, all the data of the GC original logical block BL0 is erased as illustrated in FIG. 6B. The data-erased logical block BL0 may become a GC destination logical block.

Next, as illustrated in FIG. 6C, another candidate among the GC original logical block candidates, for example, the logical block BL1 becomes the GC original logical block, data is read from the GC original logical block BL1 on a pseudo physical cluster basis, and when the pseudo physical cluster is a valid cluster, the read data is moved to the GC destination logical block BL3.

If the amount of data to be moved (written) to the GC destination logical block BL3 increases, the GC destination logical block BL3 enters a state of a program completion as illustrated in FIG. 7A, and the data is no longer moved from the GC original logical block BL1 to the GC destination logical block BL3.

However, since there is the data-erased logical block BL0 which can become the GC destination logical block, thereafter, as illustrated in FIG. 7B, the data read from the valid cluster of the GC original logical block BL1 is moved to the GC destination logical block BL0, and the garbage collection is continued.

If data is read from all the valid clusters of the GC original logical block BL1 and the data is moved to the GC destination logical block BL0, as illustrated in FIG. 7C, all the data of the GC original logical block BL1 is erased. The data-erased logical block BL1 may become the GC destination logical block. In this way, the garbage collection is continued as long as a data-erased logical block is newly generated.

Next, an example in which performing the garbage collection cannot be continued will be described with reference to FIG. 8A to FIG. 9B. In the same manner as in a case of FIG. 6A, as illustrated in FIG. 8A, the data read from the valid cluster of the GC original logical block BL0 is moved to the GC destination logical block BL3 and the garbage collection is performed.

As illustrated in FIG. 8B, when the data read from the pseudo physical cluster of the GC original logical block BL0 during the garbage collection includes an error and the error is uncorrectable, it cannot be determined whether the cluster is a valid cluster or an invalid cluster, and the data read from the cluster cannot be moved to the GC destination logical block BL3.

If the data read from all the valid clusters of the GC original logical block BL0 is moved to the GC destination logical block BL3, the logical block BL1 becomes the GC original logical block, and the data read from the valid cluster of the GC original logical block BL1 is moved to the GC destination logical block BL3 as illustrated in FIG. 8C.

Figure 9A:
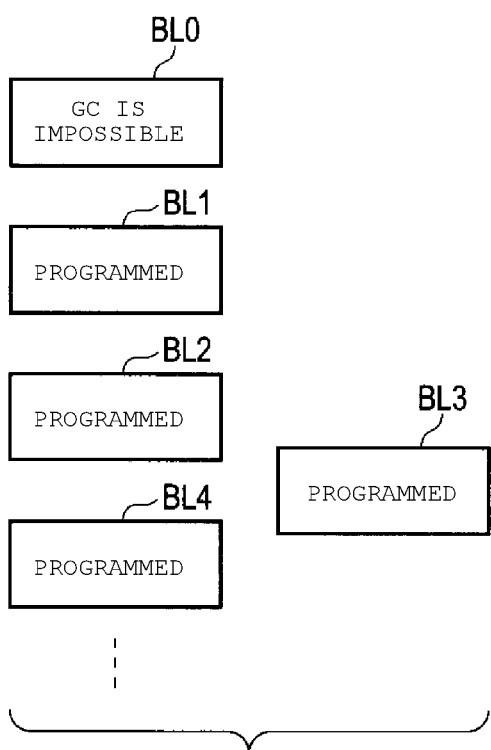
FIGS. 9A and 9B are diagrams illustrating examples of the garbage collection when the GC destination logical block is exhausted.

If the amount of data to be written to the GC destination logical block BL3 increases, the GC destination logical block BL3 enters a state of the program completion, as illustrated in FIG. 9A, and the data is no longer moved from the GC original logical block BL1 to the GC destination logical block BL3.

Figure 9B:
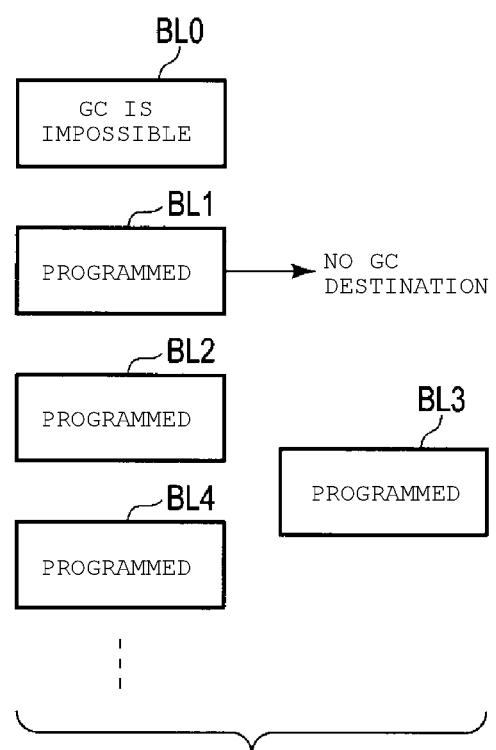

In the examples illustrated in FIGS. 6A to 7C, the data-erased logical block BL0 exists at this stage (FIG. 7A), and thereby, the garbage collection for the GC original logical block BL1 can be continued. However, as illustrated in FIG. 9A, when the GC destination logical block BL3 enters a state of the program completion, there is no logical block in which data is erased, and thus, as illustrated in FIG. 9B, there is no GC destination logical block of a movement destination of the data read from the valid cluster of the GC original logical block BL1, and the garbage collection can no longer be continued.

During a period in which, after an uncorrectable error illustrated in FIG. 8B occurs, the GC destination logical block BL3 illustrated in FIG. 9A enters a state of a program completion and there is no logical block in which data is erased, if a correspondence relationship between all logical addresses and all physical addresses of the LUT 56 is examined, it is possible to determine whether the pseudo physical cluster storing data in which an uncorrectable error occurs is a valid cluster or an invalid cluster. However, if a size of the LUT 56 is large, it is impossible to examine the correspondence relationship between all the logical addresses and all the physical addresses of the LUT 56 within the period.

In order to avoid such a situation, it is conceivable to prepare in advance many data-erased logical blocks which may become the GC destination logical blocks. FIGS. 10A to 11C illustrate examples of the garbage collection when the data-erased logical blocks are prepared in advance. The logical blocks BL0, BL1, BL2, BL4, . . . program-completed and logical blocks BL3, eBL0, eBL1, . . . are blocks in which data is erased. The data-erased logical blocks eBL0, eBL1, . . . are used only as GC destination logical blocks and are not used for storing user data. The data-erased logical blocks eBL0, eBL1, . . . may be logical blocks in which user data has never been stored or may be logical blocks in which user data is stored but all data is erased by the garbage collection and are not used for storing the user data in the future.

As illustrated in FIG. 10A, the data read from the valid cluster of the GC original logical block BL0 is moved to the GC destination logical block BL3. The GC destination logical block BL3 changes from a data-erased state to a programming state.

As illustrated in FIG. 10B, when the data read from the pseudo physical cluster of the GC original logical block BL0 is uncorrectable during the garbage collection, the read data cannot be moved to the GC destination logical block BL3.

If the data read from all valid clusters of the GC original logical block BL0 is moved to the GC destination logical block BL3, as illustrated in FIG. 10C, the logical block BL1 becomes the GC original logical block, and the data read from the valid cluster of the GC original logical block BL1 is moved to the GC destination logical block BL3.

If the amount of data to be written into the GC destination logical block BL3 increases, the state of the GC destination logical block BL3 becomes a program completion state as illustrated in FIG. 11A, and the data is no longer moved from the GC original logical block BL1 to the GC destination logical block BL3.

As illustrated in FIGS. 9A and 9B, in the examples illustrated in FIGS. 8A to 9B, when the GC destination logical block BL3 enters the programmed state, there is no data-erased logical block, and thereby, the garbage collection cannot be continuously performed. However, in the examples illustrated in FIGS. 10A to 11C, the data-erased logical blocks eBL0, eBL1, . . . which may be used as the GC destination logical blocks are prepared in advance, and thereby, even if the logically unclear blocks is generated, the garbage collection can be continued. That is, as illustrated in FIG. 11A, when the GC destination logical block BL3 changes from a programming state to a programmed state, as illustrated in FIG. 11B, the data-erased logical block eBL0 becomes the GC destination logical block, the data read from the valid cluster of the GC original logical block BL1 is moved to the GC destination logical block eBL0, and the garbage collection is continued.

If data is read from all valid clusters of the GC original logical block BL1 and the data is moved to the GC destination logical block eBL0, as illustrated in FIG. 11C, all data of the GC original logical block BL1 is erased. The data-erased logical block BL1 may become the GC destination logical block.

By preparing the data-erased logical block in advance as such, even if a logically unclear block is generated, a possibility that the GC destination logical block is exhausted is reduced. However, there is also a disadvantage that a storage cost of a flash memory is increased due to the data-erased logical block previously prepared. In the examples of FIGS. 10A to 11C, a correspondence relationship between all the logical addresses and all the physical addresses of the LUT 56 is examined, and a period for determining whether the logically unclear block is a valid cluster or an invalid cluster is a period from when an uncorrectable error illustrated in FIG. 10B occurs to when the data-erased logical block is disappeared. Accordingly, the time is lengthened as compared with the case illustrated in FIGS. 8A to 9B, and there is a time margin for determining whether the logically unclear block is a valid cluster or an invalid cluster by examining the LUT 56.

FIGS. 12A to 13C illustrate the garbage collection operation that prevents the GC destination logical block from exhausting without preparing the data-erased logical block in advance. As illustrated in FIG. 12A, the data read from the valid cluster of the GC original logical block BL0 is moved to the GC destination logical block BL3.

As illustrated in FIG. 12B, when the data read from the GC original logical block BL0 during the garbage collection is uncorrectable, whether the cluster is a valid cluster or an invalid cluster cannot be determined, and the data is read from the cluster cannot be moved to the GC destination logical block BL3.

If data read from all valid clusters of the GC original logical block BL0 is moved to the GC destination logical block BL3, the new logical block n BL0 is generated as illustrated in FIG. 12C. The physical block assigned to the new logical block nBL0 is a physical block assigned to the GC original logical block BL0, and data thereof is erased. In addition, the GC original logical block BL0 is changed to a logically unclear block to which no physical block is assigned. Furthermore, as illustrated in FIG. 12C, the logical block BL1 becomes the GC original logical block, and the data read from the valid cluster of the GC original logical block BL1 is moved to the GC destination logical block BL3.

If the data to be written to the GC destination logical block BL3 increases, the GC destination logical block BL3 enters a programmed state as illustrated in FIG. 13A, and the data cannot be moved from the GC original logical block BL1 to the GC destination logical block BL3. However, since there is the data-erased logical block nBL0, even if a logically unclear block including a logically unclear cluster is generated, the GC destination logical block nBL0 is allocated, and as illustrated in FIG. 13B, the data read from the valid cluster of the GC original logical block BL1 is moved to the GC destination logical block nBL0.

If an uncorrectable error does not occur during data read of the GC original logical block BL1 and all data of the valid cluster of the GC original logical block BL1 is moved to the GC destination logical block nBL0, as illustrated in FIG. 13C, all the data in the GC original logical block BL1 is erased and the data-erased logical block BL1 may become the GC destination logical block.

According to the operations of FIGS. 12A to 13C, when data is read from the pseudo physical cluster of the GC original logical block during the garbage collection, if an error occurs and the error cannot be corrected, the data is moved from the valid cluster of the GC original logical block to the GC destination logical block a, and thereafter, a new logical block is generated. After data of the physical block assigned to the GC original logical block is erased, the data-erased physical block is assigned to the new logical block. Thereby, the data-erased GC destination logical block can be allocated. The GC original logical block is a logically unclear block to which no physical block is assigned. Since the data of the valid cluster of the GC original logical block is moved to the GC destination logical block, if a read command relating to the data is transmitted from the host 10 to the controller 22 thereafter, the LUT 56 points to the pseudo physical cluster or the physical block in the GC destination logical block, and thereby, data is read from the pseudo physical cluster or the physical block in the GC destination logical block. Data of an invalid cluster and a logically unclear cluster of the GC original logical block remains in the GC original logical block, but since no physical block is assigned to the GC original logical block, if a read command relating to the data of the invalid cluster and the logically unclear cluster is transmitted from the host 10 to the controller 22, no data is read and a read error is returned to the host 10. A physical read error pointing to a pseudo physical cluster in which the LUT 56 does not exist and a read error including an error in which data is uncorrectable are distinguished from each other in the controller 22, but there is no distinction between the two errors in the read error returned to the host 10 by the controller 22. Returning the read error in response to a read request relating to the logically unclear cluster is the same even when a new logical block is not generated. Accordingly, when the uncorrectable error occurs, an operation of the SSD 20 when viewed from the host 10 is not changed even when the new logical block is generated or even when the new logical block is not generated. According to the operations of FIGS. 12A to 13C, it is not necessary to provide the data-erased logical block that can be used as the GC destination logical block in order to cope with a situation where data of the GC original logical block including the logically unclear cluster cannot be erased. If a size of one logical block increases, the number of logical blocks is reduced, and thereby, the GC destination logical block is easily exhausted. However, as illustrated in FIGS. 12A to 13C, if the logically unclear block is generated, a new logical block is generated, and thereby, exhaustion of the GC destination logical block is prevented.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
   a nonvolatile memory including a plurality of physical blocks each including a plurality of clusters; and
   a controller configured to maintain a first table that stores a relationship between a logical address designated by an external device and a physical address of the cluster corresponding to the logical address, and a second table that stores a relationship between a logical block corresponding to the logical address and one or more of the plurality of physical blocks that are allocated to the logical block, wherein the controller is configured to perform garbage collection processing which includes:
   reading data from physical blocks of a first logical block and copying data read from valid clusters of the first logical block to physical blocks of a garbage collection destination logical block;
   creating a new logical block when any of the data read from the physical blocks of the first logical block contains an uncorrectable error;
   allocating the physical blocks corresponding to the first logical block to the new logical block; and
   updating the second table so that the physical blocks of the first logical block are associated with the new logical block and no physical blocks are associated with the first logical block.

2. The storage device according to claim 1, wherein each of the clusters stores user data and a logical cluster address that indicates a logical address of the cluster.

3. The storage device according to claim 2, wherein
   the physical address of the cluster stored in the first table is a pseudo physical cluster address corresponding to the logical cluster address, and
   the pseudo physical cluster address includes information that specifies which logical block includes the cluster corresponding to the pseudo physical cluster and information indicating a relative location of the cluster in the specified logical block.

4. The storage device according to claim 3,
   wherein the controller copies data read from a valid cluster of the first logical block to a cluster of the garbage collection destination logical block and changes the pseudo physical cluster address corresponding to a logical address of the valid cluster to the pseudo physical cluster address of the garbage collection destination logical block.

5. The storage device according to claim 3, wherein the controller determines a first cluster to be a valid cluster when a first pseudo physical cluster address of the first cluster designated in the first table matches a second pseudo physical cluster address corresponding to a logical cluster address that is stored in the first cluster, and to be an invalid cluster when the first pseudo physical cluster address does not match the second pseudo physical cluster address.

6. The storage device according to claim 1,
   wherein, if the controller receives a read command targeting a cluster of the first logical block in which the read data is uncorrectable from the external device after the second table is updated, the controller transmits information indicating a read error to the external device.

7. The storage device according to claim 1,
   wherein, in a subsequent garbage collection processing, the controller allocates the new logical block as a garbage collection destination logical block.

8. A method of performing garbage collection in a storage device comprising a nonvolatile memory including a plurality of physical blocks each including a plurality of clusters, and a controller configured to maintain a first table that stores a relationship between a logical address designated by an external device and a physical address of the cluster corresponding to the logical address, and a second table that stores a relationship between a logical block corresponding to the logical address and one or more of the plurality of physical blocks that are allocated to the logical block, said method comprising:
   reading data from physical blocks of a first logical block and copying data read from valid clusters of the first logical block to physical blocks of a garbage collection destination logical block;
   creating a new logical block when any of the data read from the physical blocks of the first logical block contains an uncorrectable error;
   allocating the physical blocks corresponding to the first logical block to the new logical block; and
   updating the second table so that the physical blocks of the first logical block are associated with the new logical block and no physical blocks are associated with the first logical block.

9. The method according to claim 8, wherein each of the clusters stores user data and a logical cluster address that indicates a logical address of the cluster.

10. The method according to claim 9, wherein
    the physical address of the cluster stored in the first table is a pseudo physical cluster address corresponding to the logical cluster address, and
    the pseudo physical cluster address includes information that specifies which logical block includes the cluster corresponding to the pseudo physical cluster and information indicating a relative location of the cluster in the specified logical block.

11. The method according to claim 10,
    wherein the data read from a valid cluster of the first logical block is copied to a cluster of the garbage collection destination logical block and the pseudo physical cluster address corresponding to a logical address of the valid cluster is changed to the pseudo physical cluster address of the garbage collection destination logical block.

12. The method according to claim 10, further comprising:
    determining a first cluster to be a valid cluster when a first pseudo physical cluster address of the first cluster designated in the first table matches a second pseudo physical cluster address corresponding to a logical cluster address that is stored in the first cluster, and to be an invalid cluster when the first pseudo physical cluster address does not match the second pseudo physical cluster address.

13. The method according to claim 8, further comprising:
responsive to a read command targeting a cluster of the first logical block in which the read data is uncorrectable from the external device after the second table is updated, transmitting information indicating a read error to the external device.

14. The method according to claim 8, further comprising:
in a subsequent garbage collection processing, allocating the new logical block as a garbage collection destination logical block.

\* \* \* \* \*